United States Patent [19]

Verdick

[11] Patent Number: 5,542,699
[45] Date of Patent: Aug. 6, 1996

[54] METHOD AND ARTICLE FOR PROTECTING A MOTOR VEHICLE COMPONENT

[76] Inventor: George W. Verdick, 522 Delavan Dr., Delavan, Wis. 53115

[21] Appl. No.: 550,824

[22] Filed: Oct. 31, 1995

[51] Int. Cl.$^6$ ............................ B60R 21/22; B60R 21/16; B65D 65/02
[52] U.S. Cl. ...................... 280/732; 280/728.1; 150/154; 29/458; 29/424
[58] Field of Search .......................... 280/728.3, 728.1, 280/728.2, 732, 731, 730.1, 727, 770, 752; 296/136, 70, 95.1; 180/90; 150/154, 166, 168; 29/458, 424; 160/352, 368.1, 370.21, DIG. 16

[56] References Cited

U.S. PATENT DOCUMENTS

| | | | |
|---|---|---|---|
| 2,844,387 | 7/1958 | Shaw | 280/752 |
| 3,207,274 | 9/1965 | Baermann | 150/154 |
| 3,358,355 | 12/1967 | Youssi et al. | 29/424 |
| 3,642,567 | 2/1972 | Rogers, Jr. | 296/136 |
| 3,904,222 | 9/1975 | Bursott et al. | 280/732 |
| 4,508,381 | 4/1985 | Herring | 280/752 |
| 4,560,245 | 12/1985 | Sarver | 296/95.1 |
| 4,734,312 | 3/1988 | Sugiyama | 296/136 |
| 4,746,385 | 5/1988 | Wagner et al. | 280/752 |
| 4,842,300 | 6/1989 | Ziomek et al. | 280/732 |
| 4,884,824 | 12/1989 | Radke | 150/166 |
| 5,002,326 | 3/1991 | Westfield et al. | 296/95.1 |
| 5,144,736 | 9/1992 | Hanson | 29/424 |
| 5,277,440 | 1/1994 | Jackson, Jr. | 280/727 |
| 5,335,935 | 8/1994 | Proos et al. | 280/728.3 |
| 5,374,079 | 12/1994 | Dukeshire et al. | 280/728.3 |
| 5,388,858 | 2/1995 | Cuevas | 280/728.2 |
| 5,398,961 | 3/1995 | Rogers et al. | 280/728.3 |
| 5,433,474 | 7/1995 | Farrington et al. | 280/728.3 |

FOREIGN PATENT DOCUMENTS

| | | | |
|---|---|---|---|
| 1-122754 | 5/1989 | Japan | 280/728.3 |
| 3-281454 | 12/1991 | Japan | 280/730.1 |
| 6-171449 | 6/1994 | Japan | 280/732 |
| 2270287 | 3/1994 | United Kingdom | 280/728.3 |

Primary Examiner—Kevin Hurley
Assistant Examiner—Peter C. English
Attorney, Agent, or Firm—Jansson & Shupe, Ltd.

[57] ABSTRACT

A cover for protecting a surface of a motor vehicle component, e.g., an air bag module, includes a body portion and a retention structure. Such structure is fixed with respect to the body portion or the module and retains the cover in a protective relationship to the surface. The module has an edge around the surface and a new method for protecting the module surface includes overlaying the surface with the protective cover having a cover lip at the module edge. An instrument panel member is positioned adjacent to the edge and the protective cover is thereafter removed from the surface and the edge. A new combination is also disclosed.

16 Claims, 4 Drawing Sheets

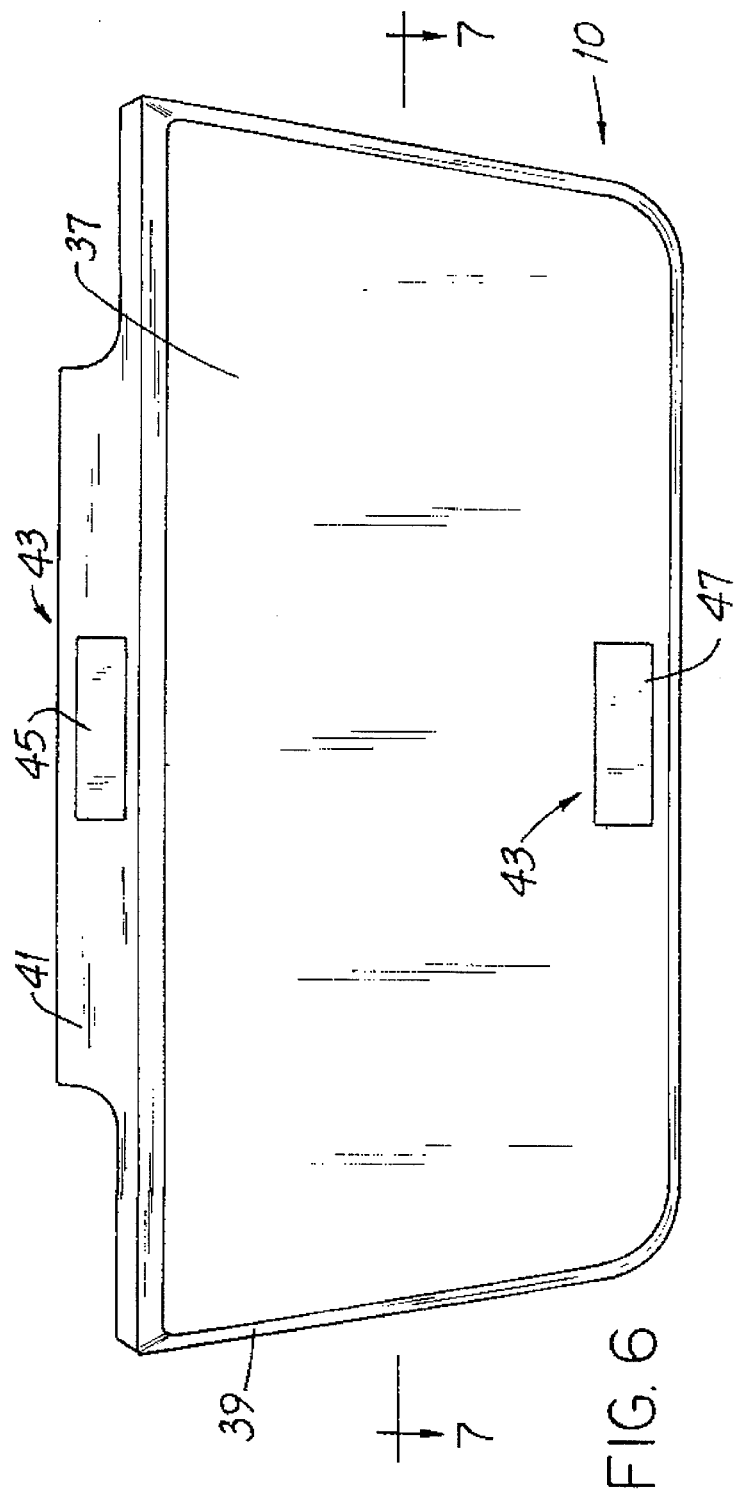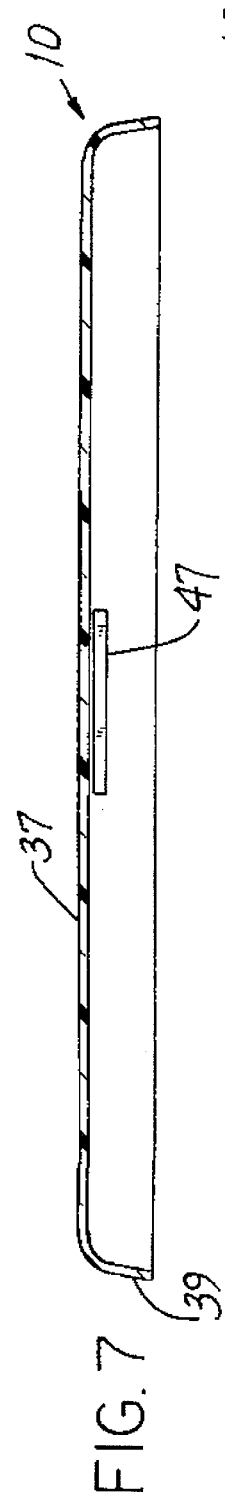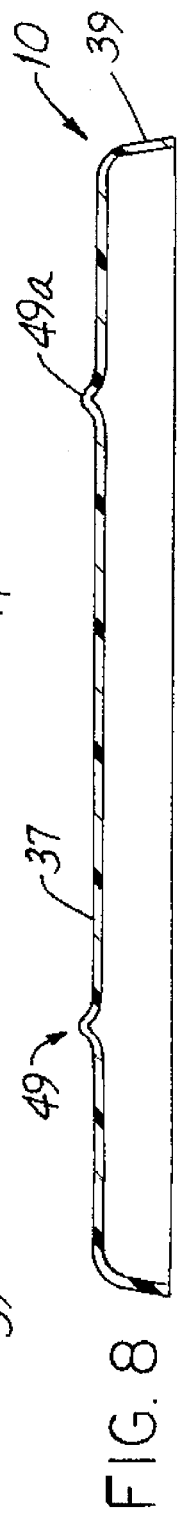

METHOD AND ARTICLE FOR PROTECTING A MOTOR VEHICLE COMPONENT

FIELD OF THE INVENTION

This invention relates generally to land vehicles and, more particularly, to protecting a surface of a vehicle component during vehicle assembly.

BACKGROUND OF THE INVENTION

Virtually any type of machine or mechanism undergoes at least one assembly step during its manufacture. And making a complex machine such as a motor vehicle may involve hundreds or even thousands of separate assembly steps.

Using a motor vehicle as an example, such vehicle has many subassembly units which are brought together on the final assembly line to make the finished vehicle. And to complete each subassembly unit, several component parts need to be brought together. An instrument panel unit is a good example.

One known approach to making an instrument panel unit involves providing a support structure, e.g., a frame, and attaching panel components to such structure and to one another. Frequently, close fitting of such components to one another is required to avoid unsightly gaps in the instrument panel unit.

Many of the components have a surface which is exposed to view in the finished vehicle and care must be taken to avoid chipping, gouging and marring of such surface. Surface impairments detract from the aesthetic quality of the vehicle and make the vehicle more difficult to sell. And such surface impairments can have a significant adverse impact upon after-sale warranty costs.

But unless a high degree of care is taken by persons on the assembly line, such exposed surfaces do become chipped or otherwise disfigured. Damage such as chipping or gouging occurs as components are being fitted to one another. And an inadvertent slip of a screwdriver or other assembly tool can scratch or dent a finished surface exposed in the completed vehicle.

Manufacturers usually strive to make vehicles that have very high mechanical and aesthetic quality. When an exposed surface becomes chipped or marred during the assembly process, there is little choice but to rework the unit, e.g., an instrument panel unit, either on the assembly line or after the vehicle is sold.

And some components cannot be repaired, at least not on the assembly line. As an example, the manufacturer must replace (not repair) an air bag assembly on which the exposed surface of the frangible cover is damaged. For reasons relating to the integrity of such assembly and the important safety feature that an air bag assembly may be called upon to perform, it is impermissible to repair such assembly. Scrap costs are high and overhead labor costs, either on the assembly or at the dealership, are very significant.

OBJECTS OF THE INVENTION

It is an object of the invention to provide an improved cover and method which overcome some of the problems and shortcomings of the prior art.

Another object of the invention is to provide an improved cover and method which are useful in the manufacture of motor vehicles.

Another object of the invention is to provide an improved cover and method which are economical to use and improve the efficiency of the process of assembling motor vehicles.

Still another object of the invention is to provide an improved cover and method which help prevent chipping, gouging and marring of surfaces which are exposed in a fully-assembled motor vehicle.

Another object of the invention is to provide an improved cover which is easily applied and removed during the assembly process.

Another object of the invention is to provide an improved cover and method which reduce scrap cost.

Yet another object of the invention is to provide an improved cover and method which reduce costs relating to reworking automotive subassemblies. How these and other objects are accomplished will become apparent from the following descriptions and from the drawings.

SUMMARY OF THE INVENTION

An aspect of the invention involves a method for protecting a motor vehicle component, e.g., an air bag module, during vehicle assembly. Such module has a surface and an edge around the surface. The method includes overlaying the surface with a protective cover having a lip at the edge and preferably at least slightly over the edge. An instrument panel member is positioned adjacent to the edge. Such panel placement thereby forms a lip groove between the panel member and the edge. The protective cover is thereafter removed from the surface and the edge. Cover removal may be immediately after panel member placement, after full assembly of the auto or at any thereafter as, e.g., when the vehicle is shipped by the manufacturer or even prior to delivery to a customer.

The module includes a projecting abutment portion adjacent to the edge and the overlaying step includes placing the lip to extend toward the abutment portion. If the surface of the module is curved (and most are), the protective cover is preferably curved to generally conform to the curvature of the surface.

In another aspect of the invention, the cover for protecting a surface of a motor vehicle component includes a body portion and, most preferably, a retention structure fixed with respect to the body portion for retaining the cover in a protective relationship to the surface. Such retention structure may include a magnetic portion, adhesive-coated tape and/or the lip extending from the body portion.

In one embodiment, the cover is made of a material which has a degree of rigidity since a cover so made is easier to handle and to fit over the module surface and the surface edge. But if additional rigidity is desired, the body portion may include a surface deformity such as a ridge or two to improve cover rigidity.

Yet another aspect of the invention involves the combination of the motor vehicle component and the protective cover. The component, an air bag module, includes the above-described surface, abutment portion and the edge between the surface and the abutment portion. The cover includes the body portion and the lip extending therefrom and overlapping the edge. The retention structure retains the component and the cover in substantially fixed relationship to one another.

Another aspect of the invention involves the combination of a motor vehicle instrument panel assembly having an air bag module and a panel member adjacent to the module, and a protective cover over the module. The module and the panel member define a groove between them and the cover includes a lip in the groove.

As the instrument panel assembly is being put together, it may be desirable or necessary to invert such assembly so that the surface of the module exposed in the finished vehicle faces downward. The combination includes a retention structure fixed with respect to the cover and preventing such cover from falling away from the surface. As noted above, such structure may include a magnetic portion, adhesive-coated tape and/or the lip extending from the body portion. Less preferably, the retention structure may also include one or more tabs engaging the module.

Further details regarding the invention are set forth in the drawings and the following detailed description.

BRIEF DESCRIPTION OF THE DRAWINGS

FIG. 6 is a top plan view of the protective cover of the invention.

FIG. 7 is a section view of the cover of FIG. 6 taken generally along the viewing plane 7—7 thereof.

FIG. 8 is a section view generally like that of FIG. 7 except showing a slightly different embodiment of the cover, i.e., an embodiment having ridge-like surface deformities for stiffening.

DETAILED DESCRIPTION OF PREFERRED EMBODIMENTS

Figure 1:
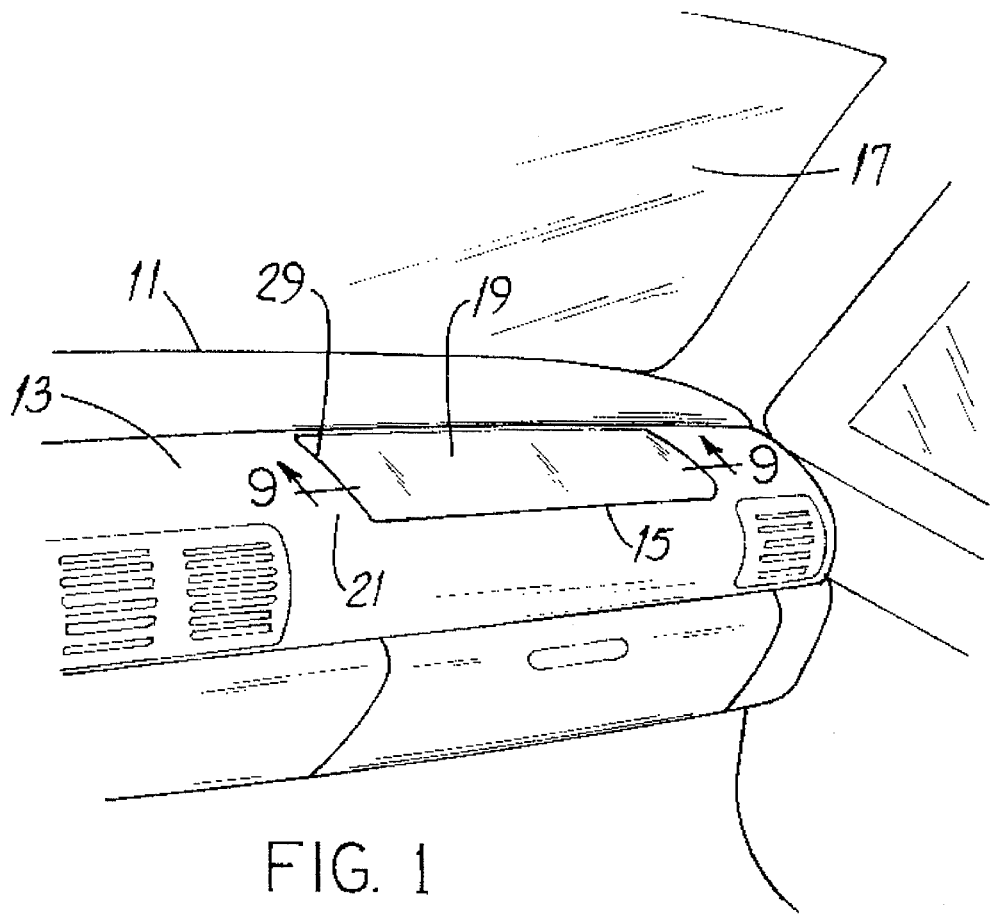
FIG. 1 is a perspective view of a portion of an automobile and its instrument panel assembly which includes an air bag module.
Figure 2:
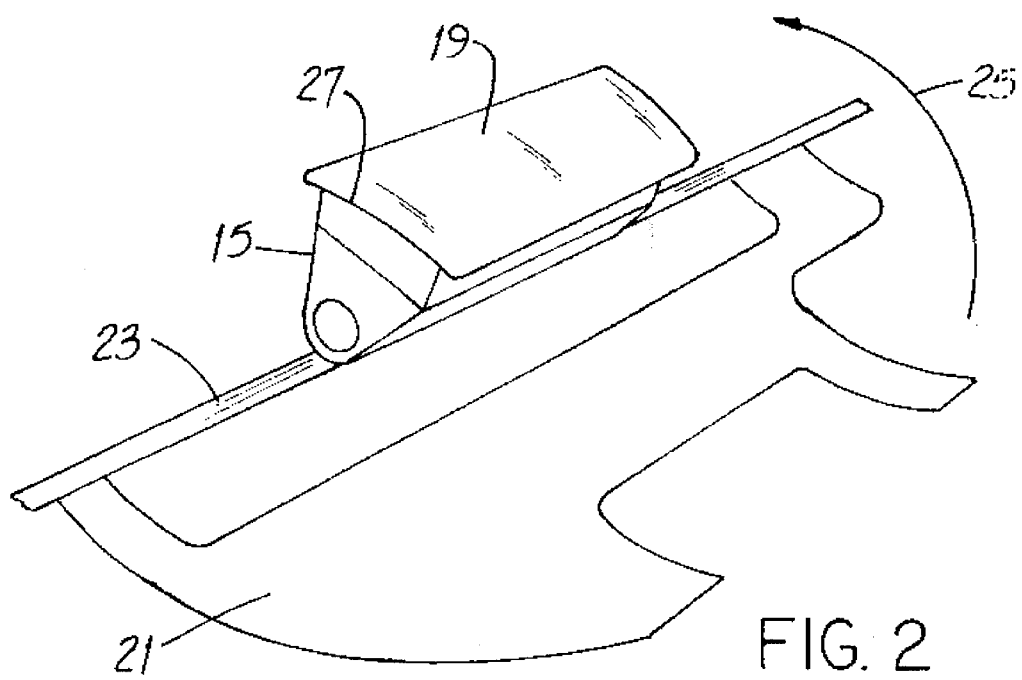
FIG. 2 is a simplified perspective view showing how a specific instrument panel assembly is put together on an assembly line. The air bag module is mounted.

Before describing the protective cover 10 and method, it will be helpful to have an understanding of certain aspects of a motor vehicle and, particularly, a motor vehicle instrument panel assembly 13 and its air bag module 15. Referring to FIGS. 1 and 2, a passenger auto 11 includes an instrument panel assembly 13 mounted generally below the windshield 17 and forward of the driver and front passenger seats.

The instrument panel assembly 13 includes an air bag module 15, the exposed surface 19 of which is visible in FIG. 1. Such assembly 13 also includes a panel member 21 which fits around and is closely adjacent to the module 15. It has been the practice to suspend the assembly 13 from a moving conveyor and attach component parts, e.g., the module 15, as the assembly 13 moves from station to station. The finished assembly 13 is then mounted in the auto 11.

Figure 4:
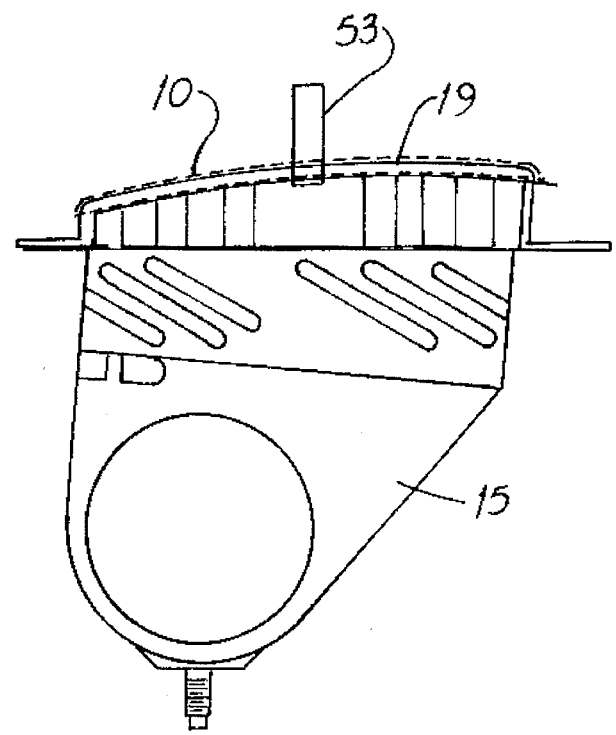
FIG. 4 is an end elevation view of the air bag module of FIG. 3 taken along the viewing plane 4—4 thereof.
Figure 3:
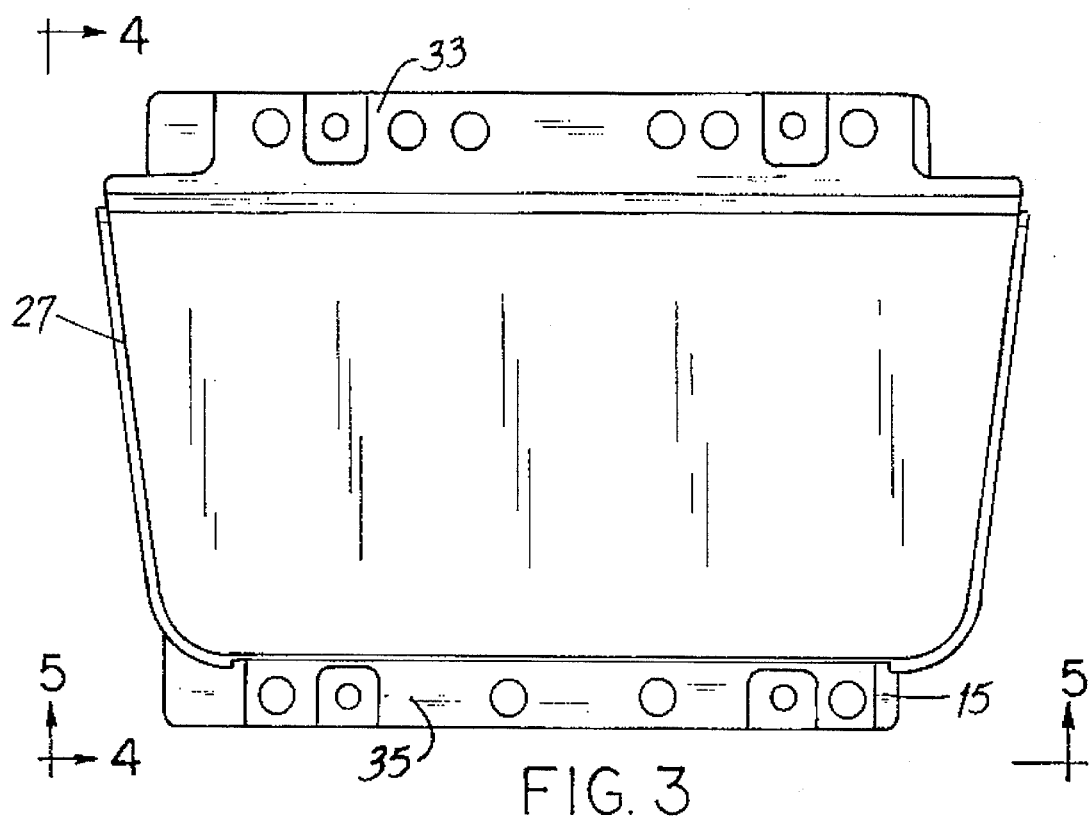
FIG. 3 is a top plan view of the air bag module shown in FIGS. 1 and 2.
Figure 5:
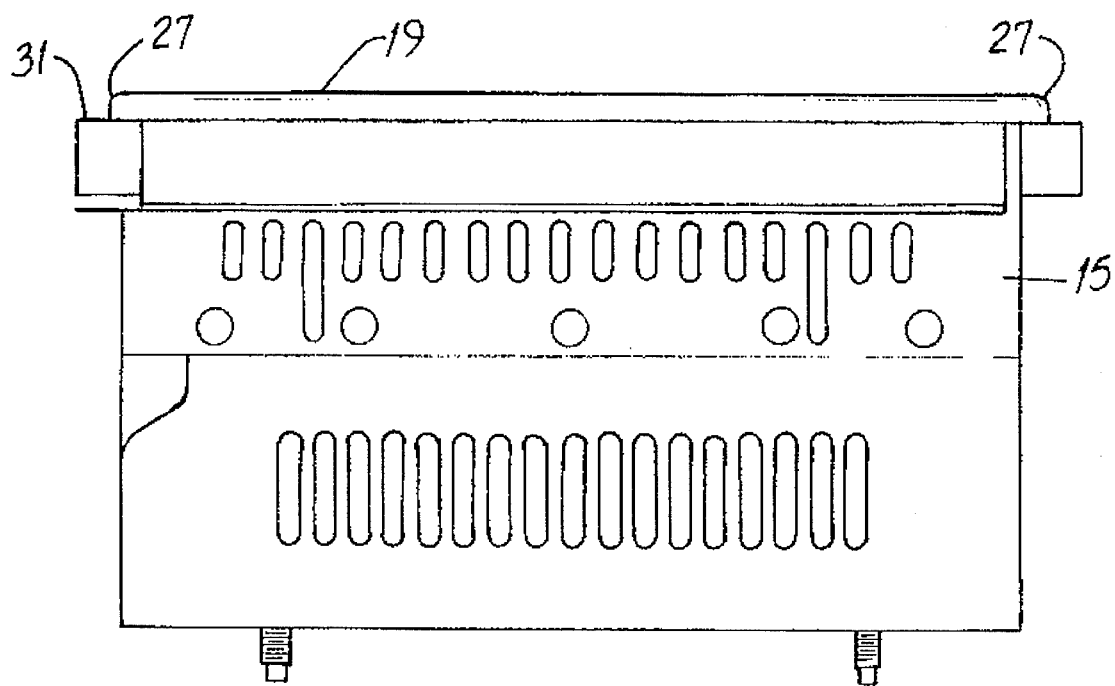
FIG. 5 is a side elevation view of the air bag module of FIG. 3 taken along the viewing plane 5—5 thereof.

Referring also to FIGS. 3, 4 and 5, in a particular auto 11, the Dodge® NEON®, the module 15 is mounted on an assembly support frame 23 and the panel member 21 is configured to swing (as represented by the arrow 25) and fit around such module 15. Prior to the invention, the procedure involving placement of the panel member 21 around the module 15 resulted a significant amount of scrap and rework cost because of damage to the module surface 19 and edge 27, especially along the junction groove 29. (The module surface 19 also sustained damage from tools as the assembly 13 was being put together.)

Figure 10:
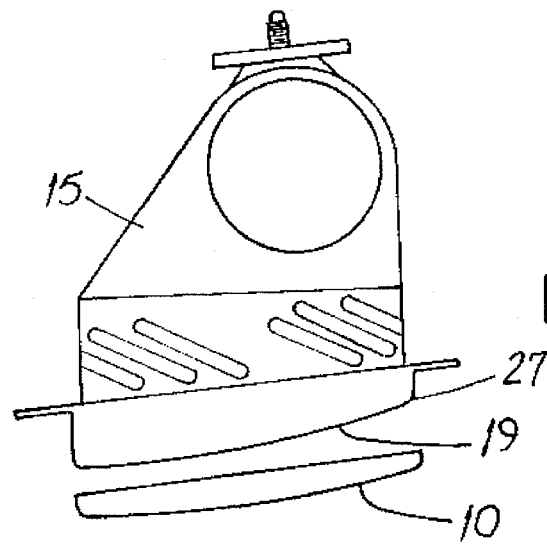
FIG. 10 is an end elevation view of the air bag module of FIGS. 3–5 showing such module in an inverted position as it may be during certain assembly line procedures.

The module surface 19 is slightly curved in one plane (as shown in FIGS. 4 and 10) and has an edge 27 therearound and such edge 27 extends from the surface 19 to an abutment portion 31. The latter is so named because the panel member 21 abuts or is very closely adjacent to such portion 31 in the finished vehicle and when the assembly 13 is put together. The module 15 also has upper and lower protrusions 33, 35, respectively, which may be made at least in part of metal.

Referring also to FIGS. 6, 7, 8 and 9, the new protective cover 10 will now be described. Such cover 10 includes a body portion 37 which, preferably, is conformably shaped to the surface 19 of the module 15, whether flat or curved. A lip 39 is around the body portion 37 and extends away from such portion 37. The cover 10 also has an elongate tang 41 which is generally in registry with the module protrusion 33 when the cover 10 overlays the surface 19.

In a highly preferred embodiment, the cover 10 also has a retention structure 43 fixed with respect to the cover body portion 37. Such structure 43 holds the cover 10 in place on the module surface 19 and may include a magnetic portion 45 such as magnetic tape to adhere to the protrusion 33. Such structure 43 may also include adhesive-coated tape 47. And when the cover lip 39 is shaped and located to closely conform to the shape of the module edge 27, the lip 39 frictionally engages such edge 27 and exhibits some cover-retaining capability, as well.

It should be appreciated that the magnetic portion 45, the tape 47 and/or the lip 39 can be used alone or cooperatively to retain the cover 10 in place on the module 15. It should also be appreciated that when the retention structure 43 is embodied as a magnetic portion 45 and/or adhesive tape 47, such structure 43 need not necessarily be applied first to the cover 10. Such structure 43 may be applied to and fixed with respect to the module 15 and the cover 10 placed thereover.

As shown in FIG. 10, the vehicle manufacturer may find it desirable to invert the instrument panel assembly 13 as components are mounted thereon. In that eventuality, the retention structure 43 is particularly useful to prevent the cover 10 from falling away from the surface 19. On the other hand, if the assembly 13 is in a position such that the exposed surface 19 faces directly upward or nearly so, no retention structure 43 may be required at all. The cover 10 simply reposes on the surface 19 by force of gravity.

One embodiment of the cover 10 is made of relatively-rigid 20 mil. plastic and such cover 10 has been used successfully. However, if additional rigidity is needed or if another, less-rigid material is used, the cover 10 may include one or more surface deformities 49 such as ridges 49a as shown in FIG. 8.

Figure 9:
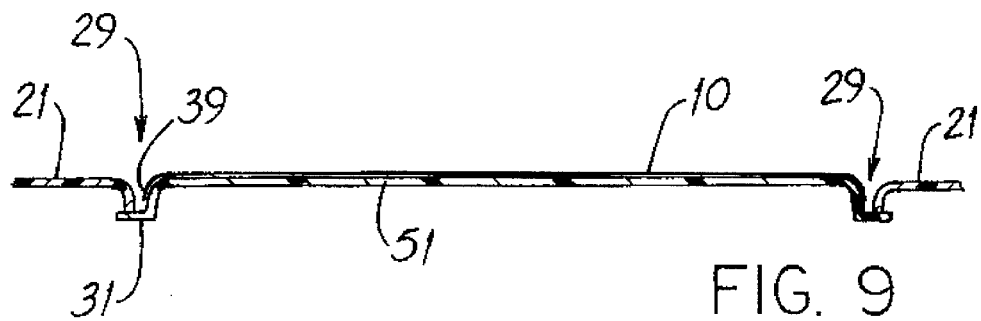
FIG. 9 is a section view of a portion of the instrument panel assembly of FIG. 1 and taken along the viewing plane 9—9 thereof.

Referring particularly to FIG. 9, when the panel member 21 is fitted around the module 15 as described above, the panel member 21 and the module panel 51 (that module panel having the exposed surface 19) define a groove between them. With the cover 10 in place, the lip 39 is in the groove 29. Such groove 29 is on the order of 0.050 inches wide so it is preferred that the new cover 10 be made of relatively thin material to fit into such groove 29.

From the foregoing, it is apparent that the new cover 10 need not be fitted to the module 15 as part of the assembly line operations. As shown in FIG. 4, such cover 10 may be fitted to the module by the module 15 manufacturer using masking tape 53 or the like. After assembly, particularly assembly of the panel 21 member, the cover 10 and tape 53 may be removed.

While the principles of the invention have been shown and described in connection with a few preferred embodiments, it is to be understood clearly that such embodiments are exemplary and not limiting.

What is claimed:

1. A method for protecting a motor vehicle air bag module having a surface and an edge around the surface, the method including:

overlaying the surface with a protective cover having a lip at the edge;

positioning an instrument panel member adjacent to the edge, thereby forming a lip groove between the panel member and the edge; and removing the protective cover from the surface and the edge.

2. The method of claim 1 wherein the module includes an abutment portion adjacent to the edge and the overlaying step includes placing the lip to extend toward the abutment portion.

3. The method of claim 2 wherein the surface is curved and the protective cover is curved to generally conform to the surface.

4. The method of claim 1 wherein the motor vehicle is a passenger auto, the method includes:

completing assembly of the auto, and the removing step includes:

removing the protective cover after completing assembly of the auto.

5. In combination, (a) an instrument panel frame having a motor vehicle air bag module supported thereon, and (b) a cover protecting such module, such cover being removable from the module without impairing the module and wherein the module includes:

an abutment portion, a surface exposed when the cover is removed, and an edge between the surface and the abutment portion, and wherein the cover includes:

a body portion protectively overlaying the surface; and a lip extending from the body portion and overlapping the edge.

6. The combination of claim 5 wherein the frame is a component of an instrument panel undergoing assembly and the combination includes a retention structure releasably retaining the cover in a protective relationship to the module during panel assembly.

7. The combination of claim 6 wherein the air bag module includes a protrusion made at least in part of metal and the retention structure includes a magnetic portion adhering to such protrusion.

8. The combination of claim 6 wherein the retention structure includes adhesive-coated tape.

9. In combination, (a) a motor vehicle instrument panel assembly having an air bag module with an outer surface and a panel member adjacent to the module, and (b) a protective cover releasably retained over the module outer surface and wherein:

the module and the panel member are spaced apart and thereby form an open groove therebetween; and the cover includes a lip extending toward the groove.

10. The combination of claim 9 wherein:

the panel assembly is in an inverted position and the outer surface is downwardly-facing; and the cover includes a retention structure holding the cover to the module in a position protectively overlaying the module surface.

11. The combination of claim 10 wherein the retention structure includes a magnetic portion.

12. The combination of claim 10 wherein the retention structure includes adhesive-coated tape.

13. In combination, (a) a motor vehicle air bag module having an outer surface, and (b) a cover protecting such module outer surface, and wherein the module includes:

an abutment portion and an edge between the surface and the abutment portion, and wherein the cover includes:

a body portion in a position protectively overlaying the module outer surface;

a lip extending from the body portion and over the edge; and a retention structure releasably retaining the cover body portion in the position, such retention structure including a magnetic portion.

14. In combination, (a) a motor vehicle air bag module, and (b) a cover protecting such module, and wherein the module includes:

a surface, an abutment portion and an edge between the surface and the abutment portion, and wherein the cover includes:

a body portion in a position protectively overlaying the module surface;

a lip extending from the body portion and overlapping the edge; and a retention structure releasably retaining the cover body portion in the position, such retention structure including adhesive-coated tape.

15. In combination, (a) a motor vehicle instrument panel assembly having an air bag module and a panel member adjacent to the module, and (b) a protective cover over the module and wherein:

the module and the panel member define a groove therebetween;

the cover includes a lip at the groove;

the panel assembly is in an inverted position and the module has a downwardly-facing surface;

the cover includes a retention structure holding the cover to the module in a position protectively overlaying the module surface; and the retention structure includes a magnetic portion.

16. In combination, (a) a motor vehicle instrument panel assembly having an air bag module and a panel member adjacent to the module, and (b) a protective cover over the module and wherein:

the module and the panel member define a groove therebetween;

the cover includes a lip in the groove;

the panel assembly is in an inverted position and the module has a downwardly-facing surface;

the cover includes a retention structure holding the cover to the module in a position protectively overlaying the module surface; and the retention structure includes adhesive-coated tape.

* * * * *